Jan. 14, 1941.                J. F. PETERS                2,229,004
                            REMOTE CONTROL SYSTEM
                            Filed June 19, 1937
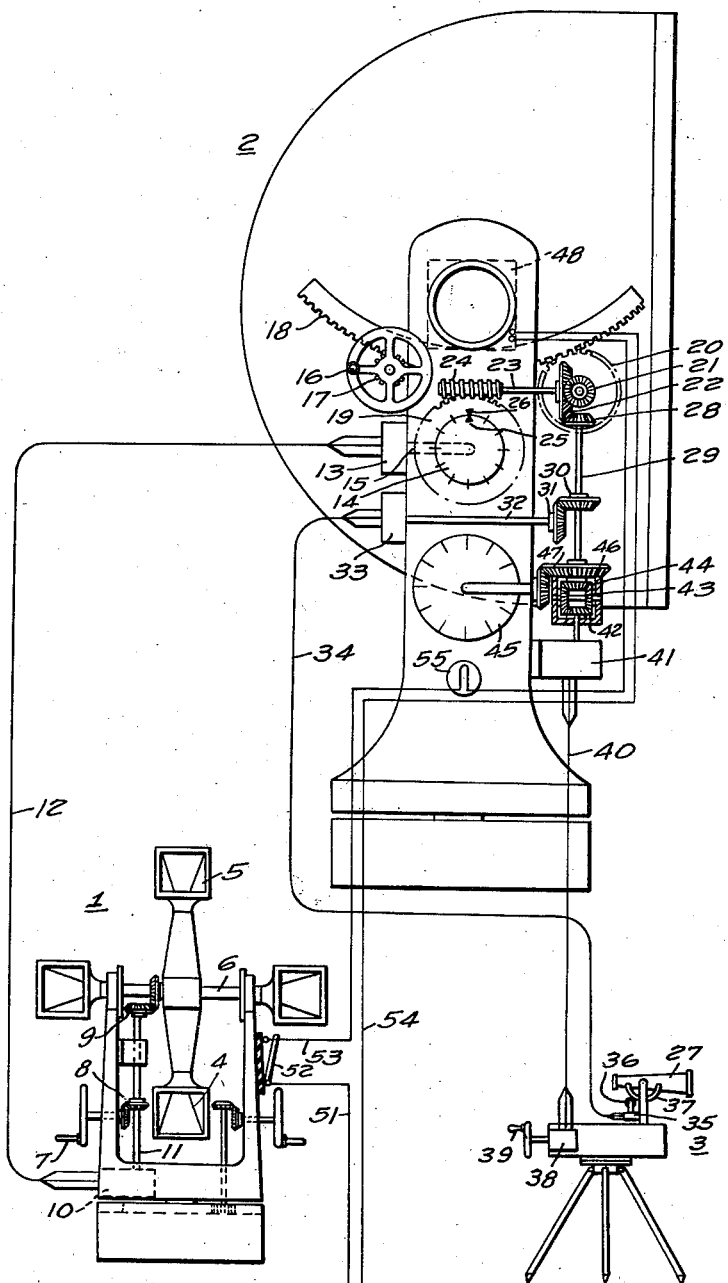
WITNESSES:                                              INVENTOR
E. A. McCloskey                                       John F. Peters
Joe Weber                                             BY
                                                      G. M. Crawford
                                                         ATTORNEY Patented Jan. 14, 1941

2,229,004

UNITED STATES PATENT OFFICE 2,229,004

REMOTE CONTROL SYSTEM

John F. Peters, Edgewood, Pa., assignor to Westinghouse Electric & Manufacturing Company, East Pittsburgh, Pa., a corporation of Pennsylvania Application June 19, 1937, Serial No. 149,185

2 Claims. (Cl. 240—1.2)

My invention relates, generally, to a system for controlling the movement of an object at a remote point and more particularly, to a system for controlling the operation of a sound detector, observation glass and searchlight so that the movements of these mechanisms may be most effectively coordinated in locating aircraft in flight after dark.

In the operation of searchlights for locating aircraft in flight at night, it is customary to provide a sound direction detector which is adjusted to determine as near as possible the elevation and azimuth of an aircraft. Mechanism is provided for causing the searchlight to be continuously pointed in the direction indicated by the sound detector and when the location of the aircraft is determined as accurately as possible the searchlight is energized to project a beam of light in the direction so determined.

Since the aircraft may be moving very fast and because the operator of the aircraft may maneuver the craft through intricate movements to avoid being seen after the beam has been projected upon or near the craft, it is necessary that means be provided for causing the light beam from the searchlight to accurately follow the movement of the aircraft so that its position may be known at all times.

Because of the high speeds of modern aircraft, the great altitudes at which they travel, and the fact that the searchlight operator is so close to the light, it is impossible for the operator to function efficiently as observer and at the same time manipulate the searchlight in accordance with his own observations. For this reason, a sighting device such as binoculars or a telescope, is commonly provided and is operated by an observer for determining the position of the aircraft, and the observer directs the positioning of the searchlight in accordance with his observations. When such a method is used it is very difficult to secure the necessary cooperation between the searchlight operator and the observer to secure the proper movement and positioning of the searchlight and such cooperation has heretofore been obtained only by highly skilled operators.

The object of my invention is to provide a simplified and efficient system for manipulating a searchlight in which the operation of the searchlight is directed by an observer situated at a point removed from the searchlight and which shall secure improved cooperation between the observer and the searchlight operator.

Another object of my invention is to provide a system for operating a searchlight in which the positioning of the searchlight and the observer's glasses or telescope, are determined by the position of a sound detector until the light is energized to project a beam and the positioning of the searchlight is then placed under the control of the observer after the searchlight projects the beam.

A further object of the invention is to provide a searchlight control system in which the positioning of the observer's glasses, telescope or the like is controlled by the movements of the searchlight and the movements of the searchlight are controlled in accordance with signals from the observer.

Another object of the invention is to provide a control system for a searchlight in which the observer's glasses, telescope or the like move in synchronism with the searchlight and in which the observer directs the positioning of the searchlight and glasses in accordance with his observations by means of an improved device for indicating to the searchlight operator the desired movement of the searchlight and glasses.

A further object of the invention is to provide a system for controlling the operation of a searchlight which shall be capable of efficient operation by operators who are not highly skilled in such operation.

Other objects and advantages of the invention will be apparent from the following detailed description taken in connection with the accompanying drawing, in which the single figure shows a diagrammatic illustration of the elements of structure and their cooperative relationship which comprise the invention.

In carrying out the invention, I have provided a searchlight with means for moving it to change the direction of beam projection in azimuth and elevation, an observation station equipped with field glasses, a telescope or the like and a sound direction determining device. Remote control means are provided for indicating to the searchlight operator the position of the sound detector in azimuth and elevation so that he may direct the searchlight in the direction from which the sound is emanating.

A control means is provided for positioning the observation glasses in accordance with the positioning of the searchlight. Means are provided for indicating to the searchlight operator from the observation station the necessary movement of the searchlight, as determined by the observer, for keeping the searchlight beam projected in the proper direction.

Referring to the drawing, I have shown a system for controlling the movement of the searchlight in a vertical plane about a horizontal axis. This movement controls the elevation of the searchlight. The mechanism for controlling the movement of the searchlight in a horizontal plane, that is, the azimuth of the searchlight, is not shown since it would be a duplicate of the apparatus shown for securing proper elevation of the searchlight and would only further complicate the drawing. However, such a duplicate apparatus for controlling the positioning of the searchlight in azimuth would be necessary in actual practice.

A sound detector 1 comprising pick-up devices 4 and 5, which may be moved about the horizontal axis 6 by crank 7 through gear trains 8 and 9, to determine the direction from which a sound is emanating, is provided for determining the angle in elevation at which an aircraft whose location it is desired to determine is positioned.

In order to position the searchlight at the angle in elevation determined by the sound detector, a synchro-tie sending mechanism 10 is made to move by connection with the sound detector through shaft 11 in synchronism with the movement of the sound detector and this synchro-tie device is connected through conductor 12 with a synchro-tie receiving mechanism 13 which operates an indicating dial 14 at the searchlight through shaft 15.

The elevational movement of the searchlight is controlled by a crank 16 disposed to operate pinion 17 on rack 18. Dial 19 is caused to move in synchronism with the movement of the searchlight in elevation through gearing which comprises pinion 20, bevel gears 21 and 22, shaft 23 and worm 24.

Indicating dial 14 carries a position marker 25 and dial 19 carries position marker 26 and the searchlight operator keeps the searchlight at the proper angle in elevation as determined by the sound direction detector by so turning crank 16 as to cause pointer 26 to always coincide with pointer 25.

A sighting device 3 includes a telescope, binoculars, or a similar instrument 27, which is moved to always point in the direction in which the searchlight is pointing by a mechanism which includes bevel gear 28, which meshes with bevel gear 22 on shaft 29, bevel gears 30 and 31, shaft 32, synchro-tie sending device 33, conductor 34 and synchro-tie receiving device 35. The receiving device 35 operates to move the sighting device 27 in elevation through a pinion 36 and rack 37 which is connected to the sighting device 27.

An indicating device is provided for permitting the observer at the observation station 3 to indicate to the searchlight operator the desired movement of the searchlight in order to keep the searchlight beam pointing in the direction of the aircraft which is being sighted. This indicating means includes a synchro-tie sending device 38 at the observation station 3, which is operated by a crank 39, and which is connected by conductor 40 to a synchro-tie receiving device 41 at the searchlight. Receiving device 41 operates a bevel gear 42, which cooperates with a differential gear device 43 and a second bevel gear 44 which is operated through shaft 29 in synchronism with the movement of the searchlight. The differential movement between gears 42 and 44 causes movement of indicating disc 45 through bevel gears 46 and 47.

A control system is provided whereby the operator of the sound detector 1 may cause energization of the searchlight to project a beam when he has determined the positioning of the searchlight which will project a beam in the direction from which the sound is emanating. This system includes any well known automatic mechanism 48 for striking the arc of the searchlight, if it is an arc searchlight, or any other suitable mechanism for causing the energization of the source of light 5 of the searchlight. This mechanism is not shown in detail in the drawing since it may be any suitable mechanism for performing this function and may be such a mechanism as is described and illustrated in the copending application of A. L. Atherton et al., Serial No. 149,164, filed June 19, 1937, having a common assignee with the present case, now patent No. 2,184,765, Dec. 26, 1939. This mechanism is energized through a circuit which extends from power source 49, through conductor 51, contact device 52, conductor 53, lamp 55, mechanism 48 and conductor 54 to the other side of the power source 50. A lamp 55 is provided in circuit with the arc striking mechanism so that the indicating dial 45 may be illuminated at the time the arc is struck.

In the operation of the system when the operator at the listening station has determined by movement of the sound detector mechanism 1 the direction from which the sound is emanating, he closes switch element 52 to energize the light source of the searchlight, thus causing the searchlight to project a beam in the direction from which he has determined the sound is emanating. While the sound detector 1 has been moving, dial 14 at the searchlight has moved in synchronism with it and the operator of the searchlight has actuated crank 16 to cause dial 19 to so move as to make the marking 26 thereon coincide with the marking 25 on dial 14. Thus when the searchlight is energizing it will be pointing in the direction indicated to it by the sound direction indicator 1. All motions of the searchlight are transmitted to the instrument 27 on the sighting device 3 through mechanism which includes the synchro-tie devices 33 and 35 and the instrument is, therefore, pointing in the same direction as the searchlight at the time that the searchlight is energized.

After the searchlight has projected a beam in the direction of the aircraft further movement of the searchlight is directed by the observer at the sighting device 3, since the sighting device is a more accurate instrument for determining the exact position of the plane and following its movements than the sound direction detector. In accordance with his observations, the observer at the sighting device indicates to the searchlight operator the direction in which he desires the operator to move the beam by operating crank 39. Operation of crank 39 will cause movement of disc 45 at the searchlight in one direction or the other, depending upon the direction in which crank 39 is turned, which in turn is determined by the observer in accordance with whether he wants the bear raised or lowered.

When the searchlight operator sees the disc 45 moving, he turns crank 16 to cause such movement of bevel gear 44 as will eliminate all differential movement between gears 42 and 44, that is, the searchlight operator so moves the searchlight as to cause disc 45 to stand still.

It will be apparent that by this system it is only necessary for the observer to turn crank 39 to secure the proper movement of the searchlight and the sighting device 27, and to cause the proper movement of the searchlight it is only necessary for the searchlight operator to so operate the crank 16 as to cause disc 45 to stand still when there is a tendency for it to move because of the movement of crank 39 by the observer.

The description of the system of this invention has included only the mechanism and its functioning for controlling the elevational movement of a searchlight. The movement in azimuth is controlled in a similar manner with substantially duplicate apparatus. To provide control of the searchlight in azimuth, the sound direction detector is mounted to be turned about a vertical axis, by mechanism not shown, to determine, through horizontally spaced pick-up devices, the direction in azimuth from which the sound is emanating.

The sound direction detector has a second synchro-tie sending device similar to that used to transmit the elevation indication to the searchlight, which functions to operate a dial through a synchro-tie receiving device on the searchlight. The searchlight is movable in a horizontal plane, about a vertical axis, by mechanism not shown, and mechanism is provided to move the searchlight in azimuth in accordance with the indications received from the sound direction detector.

The sighting device is movable on a vertical axis also and its movement in azimuth is controlled by a synchro-tie receiving device, not shown, which is connected with a sending device governed by the movement in azimuth of the searchlight. The observation station is also equipped with synchro-tie sending apparatus which operates a synchro-tie receiver on the searchlight. This receiver cooperates with a differential mechanism governed by the movement in azimuth of the searchlight to actuate an indicating disc to indicate to the searchlight operator the direction in which he should rotate the searchlight about its vertical axis as was explained in detail in connection with the control of the movement of the searchlight in elevation.

It will be seen that I have provided a simple yet effective system by which a searchlight may be positioned in accordance with a direction determined by a sound direction detector whereby the initial energization of the searchlight is under control of the sound detector operator and whereby a searchlight operator without any particular skill or training in such operations may cause the searchlight to move in any direction desired by an observer in accordance with the observations made by him.

In compliance with the requirements of the patent statutes, I have shown and described herein a preferred embodiment of my invention. It is understood, however, that the invention is not limited to the precise construction shown and described, but is capable of modification by one skilled in the art, the embodiments herein shown being merely illustrative of the principles of my invention.

I claim as my invention:

1. In a system for controlling a searchlight, means controlled by an operator for moving the searchlight into position to project a beam of light in any desired direction, a sound detector for determining the direction from which a sound is emanating, means under control of said sound detector for directing by indications to the operator such movement of the searchlight as will keep it in a position to project a beam in the direction determined by said sound detector, a sighting device for observing a target upon which the searchlight beam is projected, and means for directing the actuation of said searchlight moving means from a point adjacent said sighting device comprising a movable control device at said point, movable means adjacent the searchlight, means for causing said movable means to move in accordance with the movement of said control device, movable indicating means adjacent the searchlight and means for actuating said indicating means in accordance with the differential movement between the searchlight and said movable means whereby, when the searchlight is moving at the same speed as the movable means the movable indicating means will stand still.

2. In a system for controlling a searchlight, means controlled by an operator for moving the serchlight in any direction in which he is directed to move it in accordance with either his own observations or the direction determined by sound detecting apparatus or sighting apparatus, a sighting device for observing a target toward which the searchlight beam is projected, means for automatically imparting the same movements to the sighting device as are imparted to the searchlight by the operator, and means for directing the actuation of said searchlight and sighting device moving means from a point adjacent said sighting device comprising a movable control device at said point, movable means adjacent the searchlight, means for causing said movable means to move in accordance with the movement of said control device, movable indicating means adjacent the searchlight, and means for actuating said indicating means in accordance with the differential movement between the searchlight and said movable means, whereby when the searchlight is moving at the same speed as the movable means, the movable indicating means will stand still.

JOHN F. PETERS.